United States Patent [19]

Huang

[11] Patent Number: 5,286,350
[45] Date of Patent: Feb. 15, 1994

[54] WATER DISTILLER

[76] Inventor: Shan-Meng Huang, No.3, I-Chung St., San-Min Dist., Kaohsiung City, Taiwan

[21] Appl. No.: 990,008

[22] Filed: Dec. 14, 1992

[51] Int. Cl.$^5$ .......................................... B01D 3/02
[52] U.S. Cl. .................... 202/174; 202/177; 202/180; 202/181; 202/185.3; 202/185.4; 202/185.5; 202/186; 202/190; 202/193; 202/194; 202/202; 202/234; 203/1; 203/10
[58] Field of Search ............... 202/174, 181, 185.3, 202/185.4, 185.5, 186, 202, 190–193, 195, 196, 194, 234, 189, 177, 180, 179; 203/1, 10, DIG.17, 25, 87; 159/18

[56] References Cited

U.S. PATENT DOCUMENTS

| | | | |
|---|---|---|---|
| 558,775 | 4/1896 | Chase et al. | 202/192 |
| 604,550 | 5/1898 | Stretch | 203/DIG. 17 |
| 1,306,687 | 6/1919 | Doubleday | 202/185.4 |
| 2,254,538 | 9/1941 | Newman | 202/193 |
| 3,838,016 | 9/1974 | Powers | 202/202 |
| 3,975,241 | 8/1976 | Smith | 202/202 |
| 4,187,150 | 2/1980 | Rich | 202/190 |
| 4,339,307 | 7/1982 | Ellis | 202/185.4 |
| 4,687,550 | 8/1987 | Wong | 202/185.4 |
| 5,094,721 | 3/1992 | Petrek | 202/174 |

*Primary Examiner*—Wilbur Bascomb, Jr.

[57] ABSTRACT

A water distiller includes a raw water chamber for storing raw water, a main vaporization tank coupled with the raw water chamber for vaporizing raw water, a condensation device coupled with the main vaporization tank for condensing steam from the main vaporization tank, and a distilled water chamber communicated with the condensing conduit unit for accepting and storing distilled water. An auxiliary vaporization tank is communicated with the main vaporization tank and is mounted on the top end portion of the main vaporization tank. Each of the main and auxiliary vaporization tanks has a generally conical top wall which has a lower end portion that is provided with an annular water collecting groove formed in the inner surface thereof. Each of the water collecting grooves has a bottom wall which has a discharge opening formed therethrough. Each of the discharge openings is coupled with the condensation device so that distilled water and steam, which are formed in the main and auxiliary vaporization tanks, can flow from the main and auxiliary vaporization tanks and into the condensation device through the discharge opening.

4 Claims, 6 Drawing Sheets

WATER DISTILLER

BACKGROUND OF THE INVENTION

1. Field of The Invention

This invention relates to a water distiller, more particularly to a water distiller which has an improved distilled water collecting system so that the water distiller can be operated efficiently.

2. Description Of The Related Art

Figure 1:
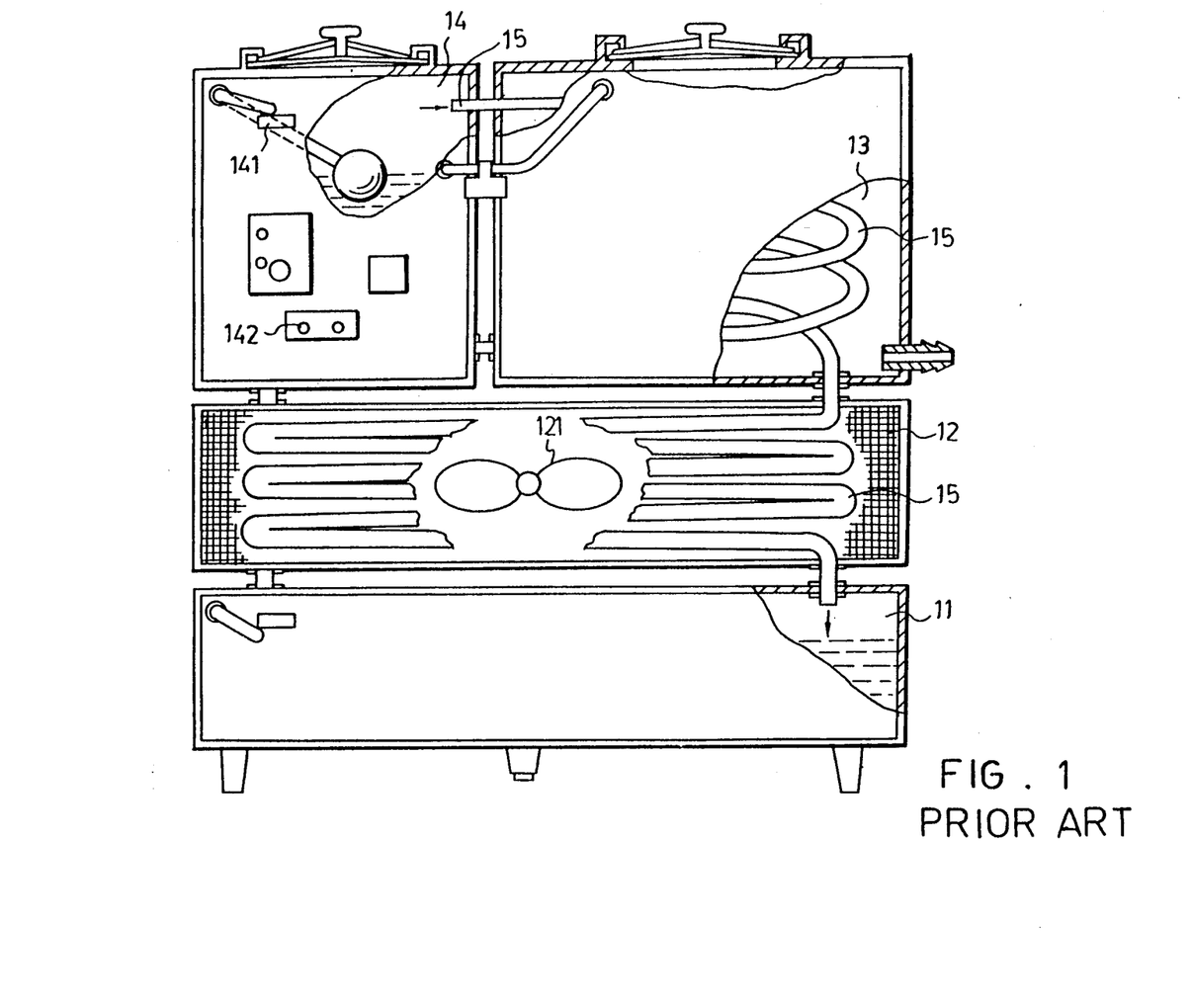
FIG. 1 is a partly sectional view showing a conventional water distiller.
Figure 2:
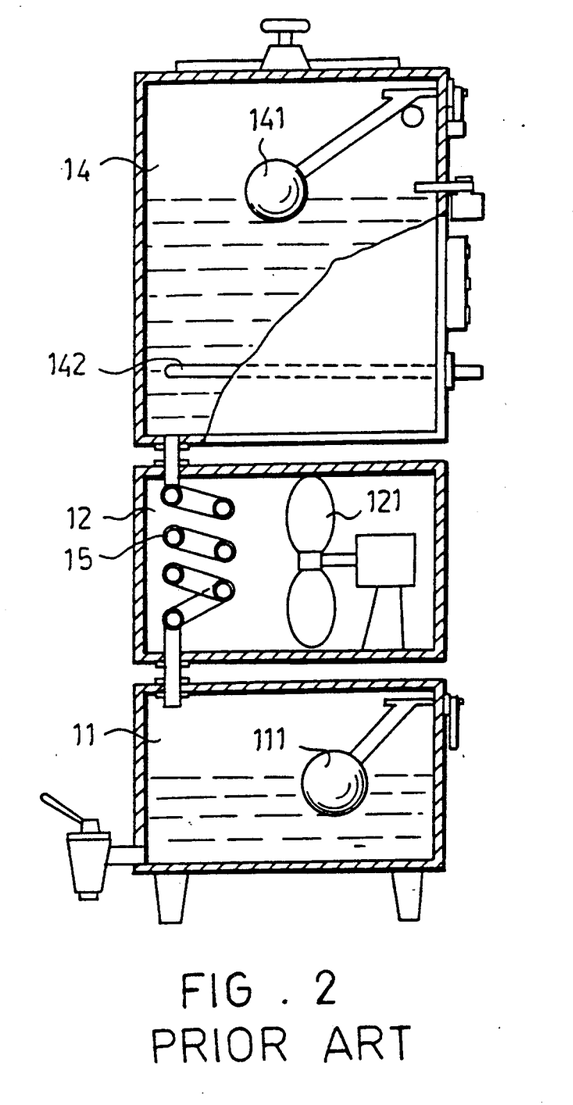
FIG. 2 is another partly sectional view of the conventional water distiller.

Referring to FIGS. 1 and 2, a conventional water distiller, which has a double cooled system, includes a distilled water chamber (11), an air-cooled chamber (12) which has a fan (121) installed therein, a water-cooled chamber (13) which is filled with water, a vaporization chamber (14) which is coupled with a water supply (not shown), and a conduit (15) which extends through the water-cooled chamber (13) and the air-cooled chamber (12) and which is communicated with the distilled water chamber (11) and the vaporization chamber (14). The vaporization chamber (14) includes a water-level controlled valve (141) connected operatively to the vaporization chamber (14) so as to control the amount of raw water flow into the vaporization chamber (14) from the water supply, and a heating device (142) installed electrically in the vaporization chamber (14) for heating the raw water in the vaporization chamber (14) to form distilled water steam. The distilled water steam flows out of the vaporization chamber (14) and into the conduit (15) so as to pass through the water-cooled chamber (13). When the steam passes through the water-cooled chamber (13), heat exchange is effected between the steam in the conduit (15) and the water in the water-cooled chamber (13) in such a manner that a large portion of the steam is condensed so as to form distilled water in the conduit (15). The distilled water and the residual steam then pass through the air-cooled chamber (12). When the residual steam passes through the air-cooled chamber (12), the residual steam is condensed in the conduit (15) so as to form distilled water by the action of the fan (121) in the air-cooled chamber (12) which blows outside air over the outer surface of the conduit (15). The distilled water chamber (11) accepts and stores the distilled water which flows out of the conduit (15). Furthermore, a controlling valve (111) is connected operatively to the distilled water chamber (11) and is coupled with the heating device (142) in such a manner that the controlling valve (111) can activate the heating device (142) of the vaporization chamber (14) so as to repeat the above-described steps when the water level of the distilled water chamber (11) drops to a predetermined level.

The drawback of the above-described conventional water distiller is that a portion of the distilled water steam, which is generated in the vaporization chamber (14), will touch the horizontal top wall of the vaporization chamber (14) so as to be condensed to form distilled water drops on the horizontal top wall of the vaporization chamber (14). Those distilled water drops will fall into the raw water in the vaporization chamber (14) and is vaporized again, thereby resulting in an inefficient operation of the water distiller.

SUMMARY OF THE INVENTION

Therefore, the main object of this invention is to provide a water distiller which has an improved distilled water collecting system so that the water distiller can operated efficiently.

According to this invention, a water distiller includes a raw water chamber for storing raw water; a main vaporization tank having a water conduit that is coupled with the raw water chamber at one end and that is communicated with the main vaporization tank at the other end, an electric heating element installed electrically in the main vaporization tank for vaporizing raw water in the main vaporization tank to form distilled water steam, a first float-controlled valve connected operatively to the water conduit, and a first float element attached to the first float-controlled valve so as to activate the first float-controlled valve in response to changes in the amount of water in the main vaporization tank, thereby introducing raw water from the water conduit into the main vaporization tank when raw water in the main vaporization tank is reduced to a predetermined amount; a condensation device including a condensing conduit unit that is coupled with the main vaporization tank, and a fan for blowing outside air over the outer surface of the condensing conduit unit so as to condense distilled water steam which flows into the condensing conduit unit from the main vaporization tank to form distilled water in the condensing conduit unit; and a distilled water chamber communicated with the condensing conduit unit for accepting and storing distilled water which is condensed from distilled water steam in the condensing conduit unit; the improvement comprising:

the main vaporization tank having a generally conical top wall so that distilled water steam which is generated in the main vaporization tank can be condensed to form distilled water drops on the inner surface of the conical top wall when the distilled water steam touches the conical top wall, the conical top wall having a lower end portion provided with an annular water collecting groove formed in the inner surface thereof, the water collecting groove having a bottom wall which has a discharge opening formed therethrough, the discharge opening being communicated with the condensing conduit unit of the condensation device so that distilled water and steam can flow from the main vaporization tank and into the condensing conduit unit through the discharge opening; and an auxiliary vaporization tank communicated with the water conduit of the main vaporization tank so that raw water can flow naturally into the water conduit from the auxiliary vaporization tank, the auxiliary vaporization tank including a water pipe which is communicated with the raw water chamber and the auxiliary vaporization tank so that raw water can flow naturally into the auxiliary vaporization tank from the raw water chamber, the auxiliary vaporization tank being mounted securely on a top end portion of the main vaporization tank in such a manner that the conical top wall of the main vaporization tank has an outer surface surrounded by raw water in the auxiliary vaporization tank so as to effect heat exchange between raw water in the auxiliary vaporization tank and distilled water steam generated in the main vaporization tank, the auxiliary vaporization tank further including a second float-controlled valve connected operatively to the water pipe, and a second float element attached to the second float-controlled valve so as to activate the second float-controlled valve in response to changes in the amount of raw water in the auxiliary vaporization tank, thereby introducing raw water from the water pipe into the auxiliary vaporization tank when raw water in the auxiliary vaporization tank is reduced to a predetermined amount, the auxiliary vaporization tank having a generally conical top wall so that distilled water steam which is generated in the auxiliary vaporization tank due to the heat exchange can be condensed to form distilled water drops on the inner surface of the conical top wall when distilled water steam touches the conical top wall, the conical top wall having a lower end portion provided with an annular water collecting groove formed in the inner surface thereof, the water collecting groove having a bottom wall which has a discharge opening formed therethrough, the discharge opening being communicated with the condensing conduit unit of the condensation device so that distilled water and steam in the auxiliary vaporization tank can flow from the auxiliary vaporization tank and into the condensing conduit unit through the discharge opening.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 3:
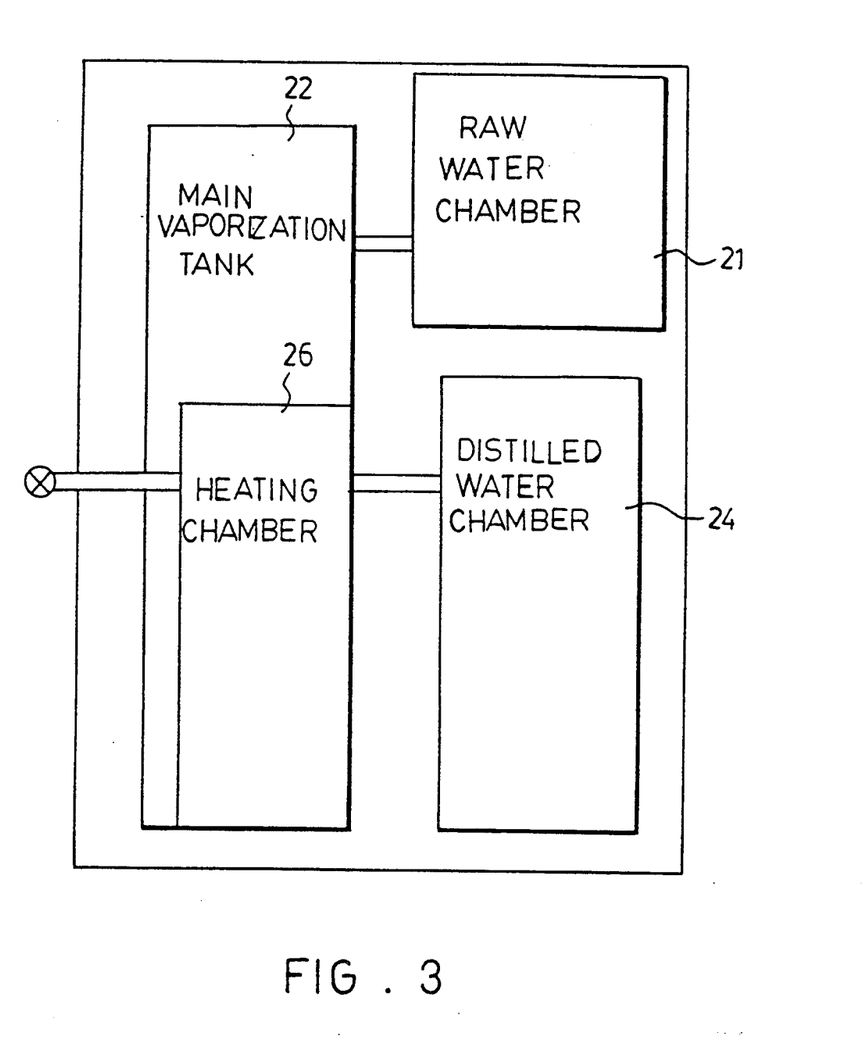
FIG. 3 is a schematic block diagram of a water distiller according to this invention.
Figure 4:
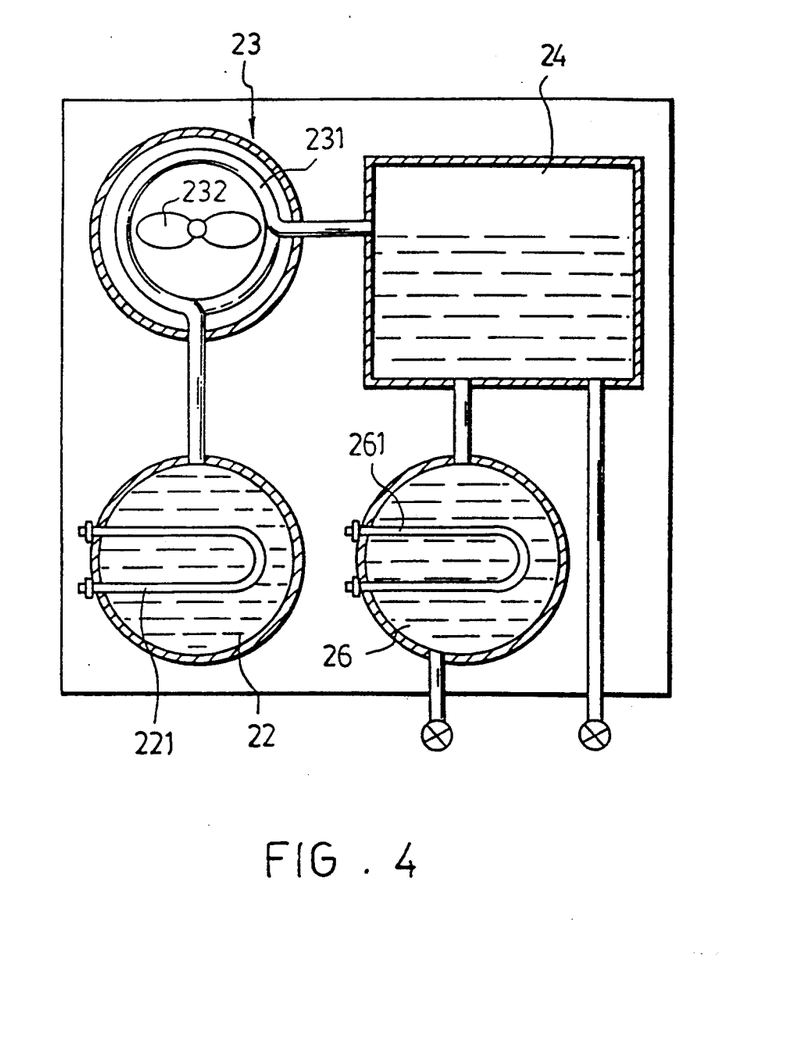
FIG. 4 is a partly sectional view showing the water distiller according to this invention.
Figure 5:
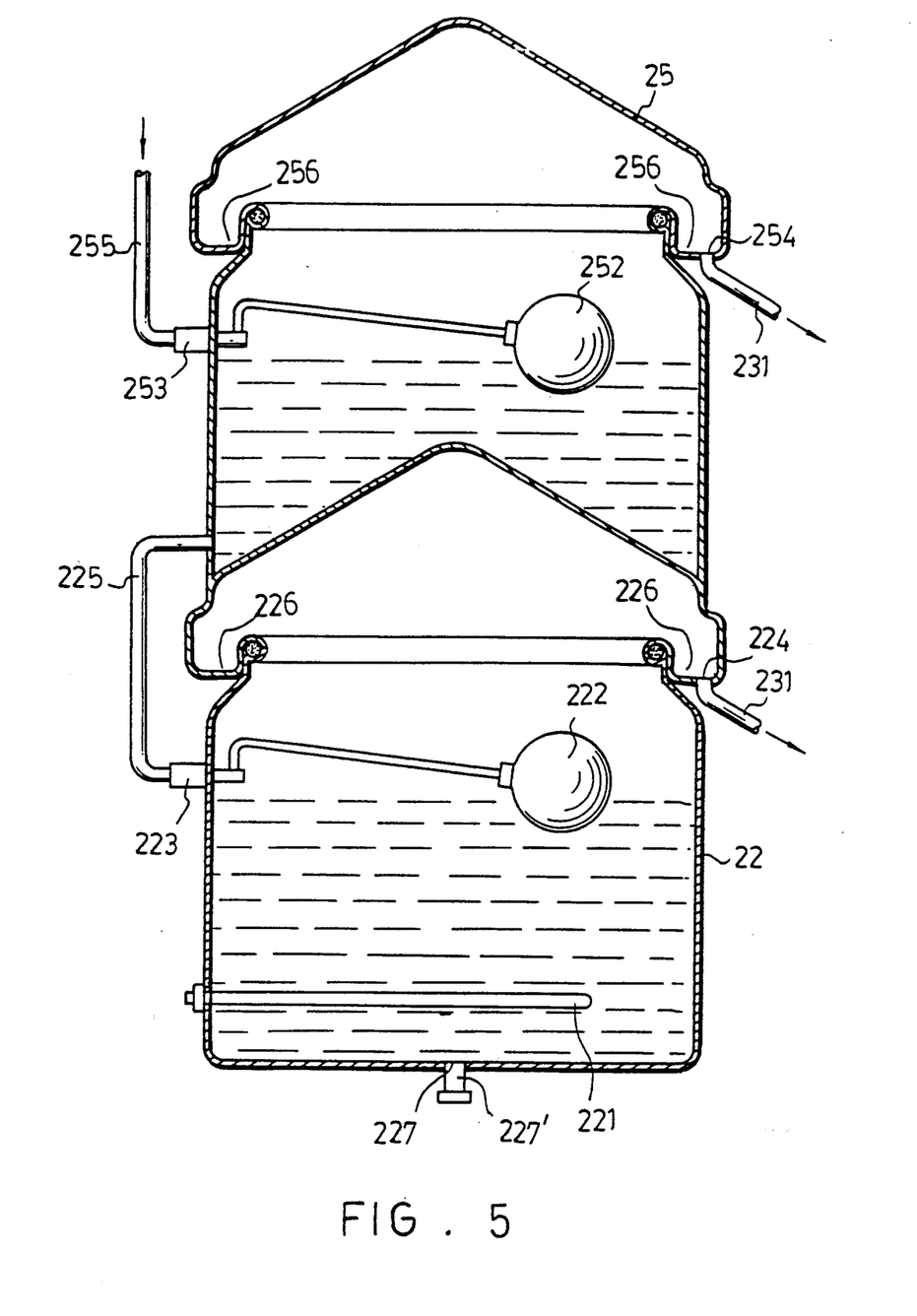
FIG. 5 is a partly sectional view showing the main and auxiliary vaporization tanks of the water distiller according to this invention.

Referring to FIGS. 3, 4 and 5, a water distiller according to this invention includes a raw water chamber (21) for storing raw water, a main vaporization tank (22), a condensation device (23) coupled with the main vaporization tank (22), a distilled water chamber (24) coupled with the condensation device (23), an auxiliary vaporization tank (25) communicated with the raw water chamber (21) and the main vaporization tank (22) so that raw water can flow naturally from the raw water chamber (21) into the auxiliary vaporization tank (25) and from the auxiliary vaporization tank (25) into the main vaporization tank (22), and a heating chamber (26) coupled with the distilled water chamber (24).

The vaporization tank (22) includes a water conduit (225), an electric heating element (221), a first float-controlled valve (223) and a first float element (222). The water conduit (225) is communicated with the auxiliary vaporization tank (25) at one end and is communicated with the main vaporization tank (22) at the other end in such a manner that raw water can flow naturally from the auxiliary vaporization tank (25) and into the main vaporization tank (22) through the water conduit (225). The electric heating element (221) is installed electrically at a lower end portion of the main vaporization tank (22) so as to vaporize raw water in the main vaporization tank (22) to form distilled water steam. The first float-controlled valve (223) is connected operatively to the water conduit (225). The first float element (222) is attached to the first float-controlled valve (223) so as to activate the first float-controlled valve (223) in response to changes in the amount of water in the main vaporization tank (22), thereby introducing raw water from the water conduit (225) into the main vaporization tank (22) when raw water in the main vaporization tank (22) is reduced to a predetermined amount. The main vaporization tank (22) has a generally conical top wall which has a lower end portion that is provided with an annular water collecting groove (226) formed in the inner surface thereof. The water collecting groove (226) can collect distilled water which is formed on the inner surface of the conical top wall of the main vaporization tank (22) when distilled water steam touches the surface of the top wall. The water collecting groove (226) has a vertical side wall, a bottom wall which has a discharge opening (224) formed therethrough, and a curved corner disposed between inner surfaces of the side wall and the bottom wall, thereby guiding condensed distilled water in the water collecting groove (226) to flow toward the discharge opening (224) in the bottom wall of the water collecting groove (226). The main vaporization tank (22) has a water discharge hole (227) formed through a bottom wall thereof and a plug (227') for stopping the water discharge hole (227) so that contaminated water in the main vaporization tank (22) can flow out of the main vaporization tank (22) through the water discharge hole (227) by removing the plug (227') from the main vaporization tank (22) after washing the main vaporization tank (22).

The condensation device (23) includes a condensing conduit unit (231) communicated with the discharge opening (224) of the main vaporization tank (22) so that distilled water and steam can flow out of the main vaporization tank (22) and into the condensing conduit unit (231) through the discharge opening (224) of the main vaporization tank (22), and a fan (232) for blowing outside air over the outer surface of the condensing conduit unit (231) so as to condense distilled water steam which flows into the condensing conduit unit (231) from the main vaporization tank (22) so as to form distilled water in the condensing conduit unit (231).

The distilled water chamber (24) is communicated with the condensing conduit unit (231) for accepting and storing distilled water which is condensed from distilled water steam in the condensing conduit unit (231) of the condensation device (23).

The auxiliary vaporization tank (25), which is communicated with the water conduit (225) of the main vaporization tank (22) so that raw water can flow naturally into the water conduit (225) from the auxiliary vaporization tank (25), includes a water pipe (255) which is communicated with the raw water chamber (21) at one end and which is communicated with the auxiliary vaporization tank (25) at the other end so that raw water can flow naturally into the auxiliary vaporization tank (25) through the water pipe (255) from the raw water chamber (21). The auxiliary vaporization tank (25) is mounted securely on a top end portion of the main vaporization tank (22) in such a manner that the conical top wall of the main vaporization tank (22) has an outer surface that is surrounded by raw water in the auxiliary vaporization tank (25) so as to effect heat exchange between raw water in the auxiliary vaporization tank (25) and distilled water steam generated in the main vaporization tank (22). The auxiliary vaporization tank (25) further includes a second float-controlled valve (253) connected operatively to the water pipe (255), and a second float element (252) attached to the second float-controlled valve (253) so as to activate the second float-controlled valve (253) in response to changes in the amount of raw water in the auxiliary vaporization tank (25), thereby introducing raw water from the water pipe (255) into the auxiliary vaporization tank (25) when raw water in the auxiliary vaporization tank (25) is reduced to a predetermined amount. The auxiliary vaporization tank (25) has a generally conical top wall so that distilled water steam which is generated in the auxiliary vaporization tank (25) due to the heat exchange can be condensed to form distilled water drops on the inner surface of the conical top wall when distilled water steam touches the conical top wall. The conical top wall has a lower end portion provided with an annular water collecting groove (256) that is formed in an inner surface thereof. The water collecting groove (256) has a bottom wall which has a discharge opening (254) formed therethrough. The water collecting groove (256) can collect distilled water which is formed on the inner surface of the top wall of the auxiliary vaporization tank (25) when distilled water steam touches the surface of the top wall. The water collecting groove (256) has a vertical side wall, a bottom wall which has a discharge opening (254) formed therethrough, and a curved corner that is disposed between inner surfaces of the side wall and the bottom wall, thereby guiding condensed distilled water in the water collecting groove (256) to flow toward the discharge opening (254) in the bottom wall of the water collecting groove (256). The discharge opening (254) is communicated with the condensing conduit unit (231) of the condensation device (23) so that distilled water and steam in the auxiliary vaporization tank (25) can flow out of the auxiliary vaporization tank (25) and into the condensing conduit unit (231) of the condensation device (23) through the discharge opening (254).

The heating chamber (26) is coupled with the distilled water chamber (24) so as to accept distilled water from the distilled water chamber (24). A temperature-controlled electric heating device (261) is installed electrically therein so as to heat the distilled water in the heating chamber (26), thereby maintaining the distilled water in the heating chamber (26) in a desired temperature.

Figure 6:
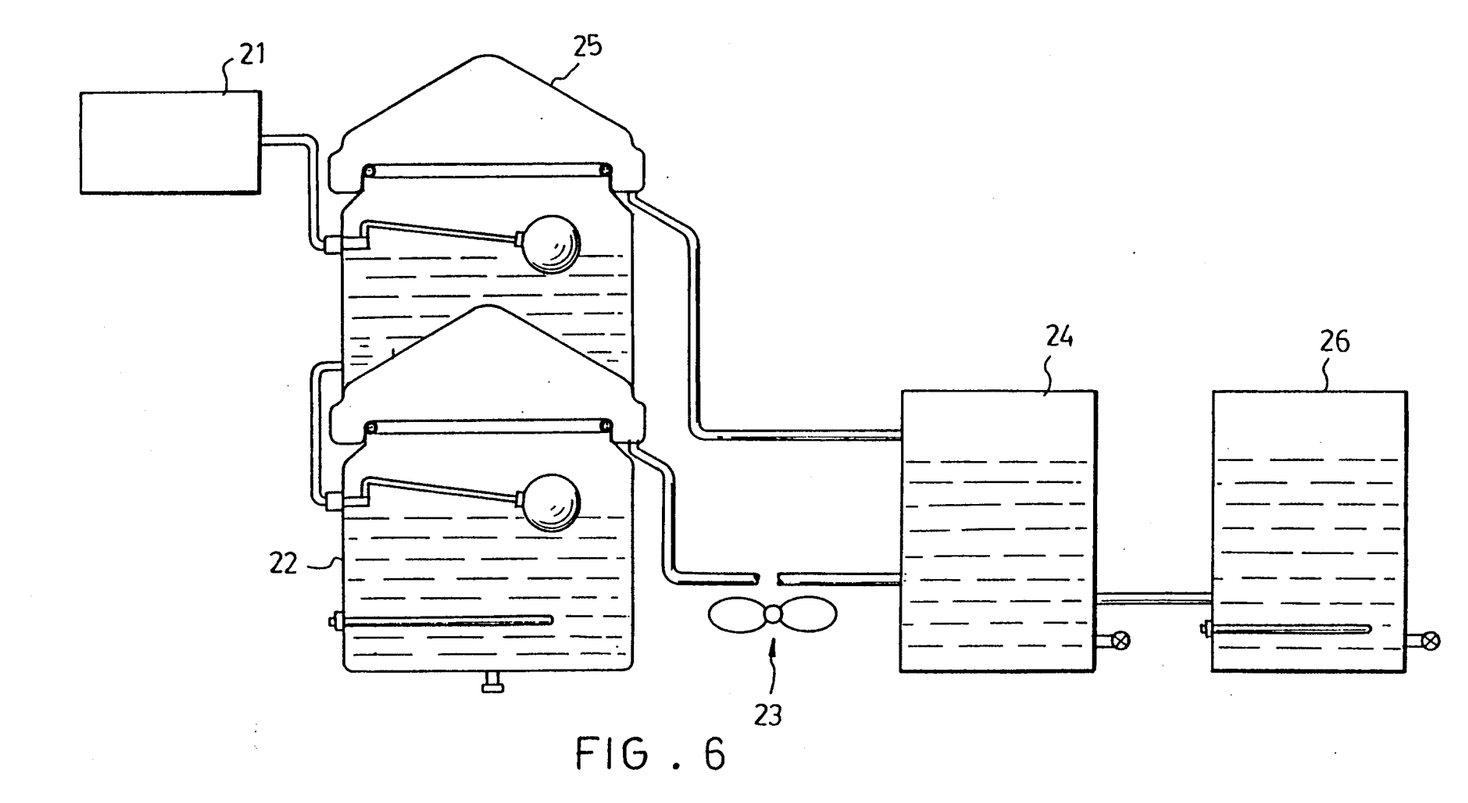
FIG. 6 is a schematic view of the water distiller according to this invention.

The following is a brief description of the operation of the water distiller according to this invention. Referring to FIGS. 5 and 6, raw water can flow naturally from the raw water chamber (21) and into the auxiliary vaporization tank (25) through the water pipe (255). The amount of raw water in the auxiliary vaporization tank (25) is controlled by the second float element (252) and the second float-controlled valve (253). The raw water in the auxiliary vaporization tank (25) can flow naturally into the main vaporization tank (22) through the water conduit (225). The amount of raw water in the main vaporization tank (22) is controlled by the first float-controlled valve (223) which, inturn, is controlled by the first float element (222). When the raw water in the main vaporization tank (22) reaches a proper level, the electric heating element (221) is operated so as to vaporize the raw water in the main vaporization tank (22), thereby generating distilled water steam in the main vaporization tank (22). A large portion of the distilled water steam can flow out of the main vaporization tank (22) and into the condensing conduit unit (231) through the discharge opening (224) of the main vaporization tank (22), while the residual steam rises to touch the inner surface of the conical top wall of the main vaporization tank (22) in such a manner that the residual steam is condensed to form distilled water drops on the surface of the top wall of the main vaporization tank (22) by the effect of heat exchange between the raw water in the auxiliary vaporization tank (25) and the residual steam in the main vaporization tank (22). The distilled water drops on the top wall of the main vaporization tank (22) slide toward the water collecting groove (226) so as to be collected by the water collecting groove (226) and then flow into the condensing conduit unit (231) through the discharge opening (224). Because of the heat exchange between the raw water in the auxiliary vaporization tank (25) and the distilled water steam in the main vaporization tank (22), the temperature of the raw water in the auxiliary vaporization tank (25) rises after repeated occurrences of heat exchange. Therefore, when the raw water in the auxiliary vaporization tank (25) is introduced into the main vaporization tank (22), it can be vaporized at a short time, thereby resulting in energy savings. Furthermore, distilled water steam may be generated in the auxiliary vaporization tank (25) due to the heat exchange. As with the main vaporization tank (22), a portion of the distilled water steam in the auxiliary vaporization tank (25) flows out of the auxiliary vaporization tank (25) and into the condensing conduit unit (231) through the discharge opening (254) of the auxiliary vaporization tank (25), while the residual steam is condensed to form distilled water drops that are collected by the water collecting groove (256). The distilled water drops flow into the condensing conduit unit (231) through the discharge opening (254). The distilled water and steam of the main and auxiliary vaporization tanks (22, 25) flow into the condensing conduit unit (231) of the condensation device (23) so that the steam is condensed to form distilled water in the condensing conduit unit (231) by the operation of the fan (232) of the condensation device (23). The distilled water in the condensing conduit unit (231) flows into the distilled water chamber (24) and is stored for drinking. A portion of the distilled water in the distilled water chamber (24) flows into the heating chamber (26) and is heated to a predetermined temperature so that the distilled water in the heating chamber (26) is maintained at a desired temperature and is stored for drinking.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A water distiller including a raw water chamber for storing raw water; a main vaporization tank having a water conduit that is coupled with said raw water chamber at one end and that is communicated with said main vaporization tank at the other end, an electric heating element installed electrically in said main vaporization tank for vaporizing raw water in said main vaporization tank to form distilled water steam, a first float-controlled valve connected operatively to said water conduit, and a first float element attached to said first float-controlled valve so as to activate said first float-controlled valve in response to changes in the amount of water in said main vaporization tank, thereby introducing raw water from said water conduit into said main vaporization tank when raw water in said main vaporization tank is reduced to a predetermined amount; a condensation device including a condensing conduit unit that is coupled with said main vaporization tank, and a fan for blowing outside air over an outer surface of said condensing conduit unit so as to condense distilled water steam which flows into said condensing conduit unit from said main vaporization tank to form distilled water in said condensing conduit unit; and a distilled water chamber communicated with said condensing conduit unit for accepting and storing distilled water which is condensed from distilled water steam in said condensing conduit unit; the improvement comprising:

said main vaporization tank having a generally conical top wall so that distilled water steam which is generated in said main vaporization tank can be condensed to form distilled water drops on an inner surface of said conical top wall when distilled water steam touches said conical top wall, said conical top wall of said main vaporization tank having a lower end portion provided with an annular water collecting groove formed in said inner surface thereof, said water collecting groove collecting distilled water drops on said conical top wall of said main vaporization tank and having a bottom wall which has a discharge opening formed therethrough, said discharge opening being communicated with said condensing conduit unit of said condensation device so that distilled water and steam can flow from said main vaporization tank and into said condensing conduit unit through said discharge opening; and an auxiliary vaporization tank communicated with said water conduit of said main vaporization tank so that raw water can flow naturally into said water conduit from said auxiliary vaporization tank, said auxiliary vaporization tank including a water pipe which is communicated with said raw water chamber and said auxiliary vaporization tank so that raw water can flow naturally into said auxiliary vaporization tank from said raw water chamber, said auxiliary vaporization tank being mounted securely on a top end portion of said main vaporization tank in such a manner that said conical top wall of said main vaporization tank has an outer surface surrounded by raw water in said auxiliary vaporization tank so as to effect heat exchange between raw water in said auxiliary vaporization tank and distilled water steam generated in said main vaporization tank, said auxiliary vaporization tank further including a second float-controlled valve connected operatively to said water pipe, and a second float element attached to said second float-controlled valve so as to activate said second float-controlled valve in response to changes in the amount of raw water in said auxiliary vaporization tank, thereby introducing raw water from said water pipe into said auxiliary vaporization tank when raw water in said auxiliary vaporization tank is reduced to a predetermined amount, said auxiliary vaporization tank having a generally conical top wall so that distilled water steam which is generated in said auxiliary vaporization tank due to said heat exchange can be condensed to form distilled water drops on an inner surface of said conical top wall of said auxiliary vaporization tank when distilled water steam touches said conical top wall, said conical top wall of said auxiliary vaporization tank having a lower end portion provided with an annular water collecting groove formed in an inner surface thereof, said water collecting groove collecting distilled water drops on said top wall of said auxiliary vaporization tank and having a bottom wall which has a discharge opening formed therethrough, said discharge opening being communicated with said condensing conduit unit of said condensation device so that distilled water and steam in said auxiliary vaporization tank can flow from said auxiliary vaporization tank and into said condensing conduit unit through said discharge opening.

2. A water distiller as claimed in claim 1, wherein said main vaporization tank has a bottom wall, a water discharge hole formed through said bottom wall of said main vaporization tank and a plug for stopping said water discharge hole, whereby, contaminated water in said main vaporization tank can flow out of said main vaporization tank through said water discharge hole by removing said plug from said discharge hole after washing said main vaporization tank.

3. A water distiller as claimed in claim 1, wherein each said water collecting groove of said main vaporization and auxiliary vaporization tanks has a vertical side wall and a curved corner between inner surfaces of said side wall and said bottom wall of said water collecting groove, thereby guiding distilled water in said water collecting groove to flow toward said discharge opening in said bottom wall of said water collecting groove.

4. A water distiller as claimed in claim 1, wherein said water distiller further comprises a heating chamber coupled with said distilled water chamber, said heating chamber accepting distilled water from said distilled water chamber and including a temperature-controlled electric heating device installed electrically therein so as to heat the distilled water in said heating chamber, thereby maintaining said distilled water in said heating chamber at a desired temperature.

* * * * *